(12) United States Patent
Snyder et al.

(10) Patent No.: US 10,634,061 B2
(45) Date of Patent: Apr. 28, 2020

(54) GAS TURBINE ENGINE ACCESSORY ARCHITECTURE

(71) Applicant: UNITED TECHNOLOGIES CORPORATION, Farmington, CT (US)

(72) Inventors: Ryan K. Snyder, Glastonbury, CT (US); Eric J. Heims, Avon, CT (US); Mark W. Colebrook, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 588 days.

(21) Appl. No.: 15/111,572

(22) PCT Filed: Feb. 4, 2015

(86) PCT No.: PCT/US2015/014354
§ 371 (c)(1),
(2) Date: Jul. 14, 2016

(87) PCT Pub. No.: WO2015/163962
PCT Pub. Date: Oct. 29, 2015

(65) Prior Publication Data
US 2016/0333791 A1 Nov. 17, 2016

Related U.S. Application Data

(60) Provisional application No. 61/948,661, filed on Mar. 6, 2014.

(51) Int. Cl.
*F02C 7/32* (2006.01)
*F02C 7/14* (2006.01)
(Continued)

(52) U.S. Cl.
CPC .............. *F02C 7/32* (2013.01); *B64C 7/02* (2013.01); *B64D 27/10* (2013.01); *B64D 29/06* (2013.01);
(Continued)

(58) Field of Classification Search
CPC ...... F02C 7/32; F02C 7/14; F02C 3/04; B64C 7/02; B64D 27/10; B64D 9/06;
(Continued)

(56) References Cited

U.S. PATENT DOCUMENTS 2,638,744 A 5/1953 Price
4,549,708 A * 10/1985 Norris .................... B64D 29/06
244/129.4
(Continued)

FOREIGN PATENT DOCUMENTS

EP 2372129 A2 10/2011

OTHER PUBLICATIONS

International Preliminary Report on Patentability for International Application No. PCT/US2015/014354 dated Sep. 15, 2016.
(Continued)

*Primary Examiner* — Craig Kim
(74) *Attorney, Agent, or Firm* — Carlson, Gaskey & Olds, P.C.

(57) ABSTRACT

A gas turbine engine comprises a compressor, a combustor and a turbine. A housing for the gas turbine engine includes a mount member to define a vertically upper location. Sides of the engine are defined on opposed sides of the mount, with a fuel filter, a fuel pump and a fuel flow meter being positioned on a first side and an oil pump, an oil filter and an oil tank positioned on a second of the sides.

13 Claims, 6 Drawing Sheets

(51) Int. Cl.
*F01D 25/28* (2006.01)
*F01D 25/20* (2006.01)
*F01D 25/26* (2006.01)
*F02K 3/06* (2006.01)
*B64C 7/02* (2006.01)
*B64D 29/06* (2006.01)
*B64D 27/10* (2006.01)
*B64D 29/08* (2006.01)
*F02C 3/04* (2006.01)
*H02K 7/18* (2006.01)

(52) U.S. Cl.
CPC ............ *B64D 29/08* (2013.01); *F01D 25/20* (2013.01); *F01D 25/265* (2013.01); *F01D 25/28* (2013.01); *F02C 3/04* (2013.01); *F02C 7/14* (2013.01); *F02K 3/06* (2013.01); *H02K 7/1823* (2013.01); *F05D 2220/327* (2013.01); *F05D 2230/72* (2013.01); *F05D 2250/30* (2013.01); *F05D 2250/411* (2013.01); *Y02T 50/671* (2013.01)

(58) Field of Classification Search
CPC ......... B64D 9/08; F01D 25/20; F01D 25/265; F01D 25/28; F02K 3/06
See application file for complete search history.

(56) References Cited

U.S. PATENT DOCUMENTS

| | | | | |
|---|---|---|---|---|
| 4,825,648 A | * | 5/1989 | Adamson | B64D 29/00 60/226.1 |
| 5,157,915 A | * | 10/1992 | Bart | B64D 27/18 244/54 |
| 6,227,485 B1 | * | 5/2001 | Porte | B64D 29/08 244/53 B |
| 7,090,165 B2 | | 8/2006 | Jones et al. | |
| 8,312,728 B2 | * | 11/2012 | Cloft | F02C 7/32 60/802 |
| 9,816,441 B2 | * | 11/2017 | Cass | F02C 7/32 |
| 2004/0238687 A1 | * | 12/2004 | Jones | B64D 29/08 244/62 |
| 2006/0091832 A1 | * | 5/2006 | Donnelly | B60L 9/22 318/108 |
| 2006/0101804 A1 | * | 5/2006 | Stretton | F02C 7/32 60/226.1 |
| 2009/0056343 A1 | | 3/2009 | Suciu et al. | |
| 2009/0129922 A1 | * | 5/2009 | Cloft | B64D 29/08 415/213.1 |
| 2010/0284806 A1 | | 11/2010 | Vauchel et al. | |
| 2012/0224950 A1 | * | 9/2012 | Fert | F02C 7/32 415/121.3 |
| 2012/0285402 A1 | * | 11/2012 | Foster | F01D 17/02 123/41.12 |
| 2013/0098058 A1 | * | 4/2013 | Sheridan | F02C 7/32 60/783 |
| 2013/0291514 A1 | | 11/2013 | Suciu et al. | |
| 2015/0121895 A1 | * | 5/2015 | Suciu | F02K 1/72 60/796 |
| 2015/0342022 A1 | * | 11/2015 | Willmot | H05K 1/0201 174/250 |
| 2016/0017812 A1 | * | 1/2016 | Sheridan | F02C 7/36 415/1 |

OTHER PUBLICATIONS

Supplementary European Search Report for European Application No. 15783136.3 dated Dec. 21, 2016.
International Search Report and Written Opinion for PCT Application No. PCT/US2015/014354 dated Oct. 26, 2015.

* cited by examiner

GAS TURBINE ENGINE ACCESSORY ARCHITECTURE

CROSS-REFERENCE TO RELATED APPLICATION

This application claims priority to U.S. Provisional Patent Application No. 61/948,661, filed Mar. 6, 2014.

BACKGROUND OF THE INVENTION

This application relates to the provision of accessories for a gas turbine engine in specific areas to facilitate maintenance.

Gas turbine engines are known and, typically, include a fan delivering air into a bypass duct as propulsion air. The fan also delivers air into a core engine. The air in the core engine is compressed and delivered into a combustion section where it is mixed with fuel and ignited. Products of this combustion pass downstream over turbine rotors, driving them to rotate.

There are a number of accessories associated with a gas turbine engine. As an example, a large gearbox drives various accessory systems, such as fuel and oil pumps. In addition, there are fuel tanks, oil tanks and any number of other associated fluid components.

In addition, there are electronic components.

All of these components are typically enclosed within a housing. The housings have pivoting doors to allow for maintenance. In the past, the arrangement of the accessories and other components has not been well ordered to facilitate maintenance access.

SUMMARY OF THE INVENTION

In a featured embodiment, a gas turbine engine comprises a compressor, a combustor and a turbine. A housing for the gas turbine engine includes a mount member to define a vertically upper location. Sides of the engine are defined on opposed sides of the mount, with a fuel filter, a fuel pump and a fuel flow meter being positioned on a first side and an oil pump, an oil filter and an oil tank positioned on a second of the sides.

In another embodiment according to the previous embodiment, pivoting doors are associated with each of the first and second sides to provide access to components.

In another embodiment according to any of the previous embodiments, an electronic engine control, a prognostic health and monitoring unit and an igniter box are all positioned on one of the first and second sides.

In another embodiment according to any of the previous embodiments, a fuel/oil cooler is positioned on a top side of the engine.

In another embodiment according to any of the previous embodiments, the fuel pump is positioned vertically below the fuel flow meter.

In another embodiment according to any of the previous embodiments, the oil pump is positioned vertically below the oil tank.

In another embodiment according to any of the previous embodiments, a main gearbox is positioned in a vertically lower quadrant on the engine.

In another embodiment according to any of the previous embodiments, a generator is also positioned in the vertically lower quadrant of the gas turbine engine.

In another embodiment according to any of the previous embodiments, an electronic engine control, a prognostic health and monitoring unit and an igniter box are all positioned on one of the first and second sides.

In another embodiment according to any of the previous embodiments, a fuel/oil cooler is positioned on a top side of the engine.

In another embodiment according to any of the previous embodiments, the fuel pump is positioned vertically below the fuel flow meter.

In another embodiment according to any of the previous embodiments, the oil pump is positioned vertically below the oil tank.

In another embodiment according to any of the previous embodiments, a main gearbox is positioned in a vertically lower quadrant on the engine.

In another embodiment according to any of the previous embodiments, a generator is also positioned in the vertically lower quadrant of the gas turbine engine.

In another embodiment according to any of the previous embodiments, a fuel/oil cooler is positioned on a top side of the engine.

In another embodiment according to any of the previous embodiments, the fuel pump is positioned vertically below the fuel flow meter.

In another embodiment according to any of the previous embodiments, the oil pump is positioned vertically below the oil tank.

In another embodiment according to any of the previous embodiments, a main gearbox is positioned in a vertically lower quadrant on the engine.

In another embodiment according to any of the previous embodiments, a generator is also positioned in the vertically lower quadrant of the gas turbine engine.

In another embodiment according to any of the previous embodiments, a generator is positioned in a vertically lower quadrant of the gas turbine engine.

These and other features may be best understood from the following drawings and specification.

DETAILED DESCRIPTION

Figure 1:
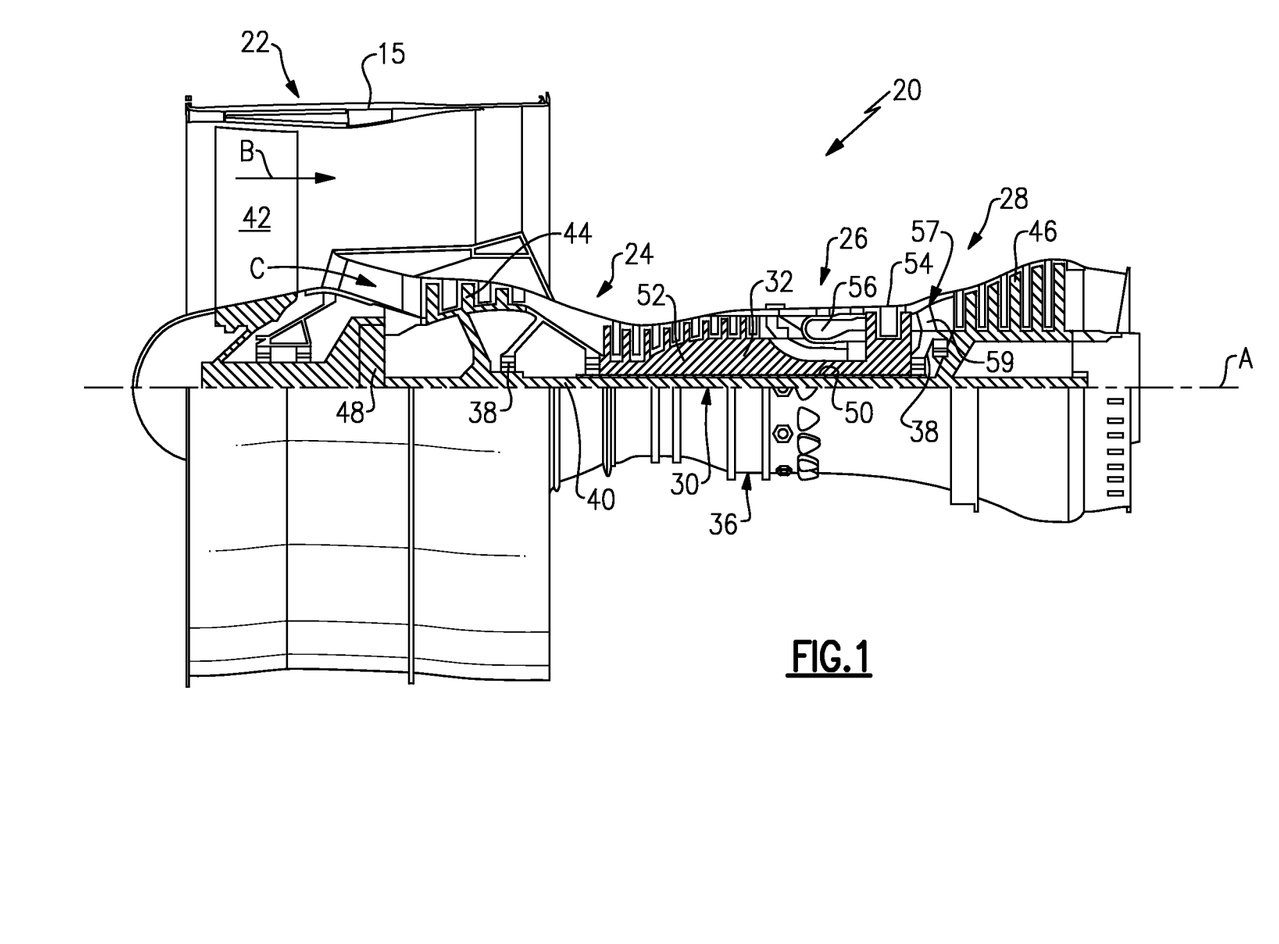
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \; ° \text{R})/(518.7° \text{R})]^{0.5}$. The "Low corrected fan tip speed" as disclosed herein according to one non-limiting embodiment is less than about 1150 ft/second (350.5 meters/second).

Figure 2:
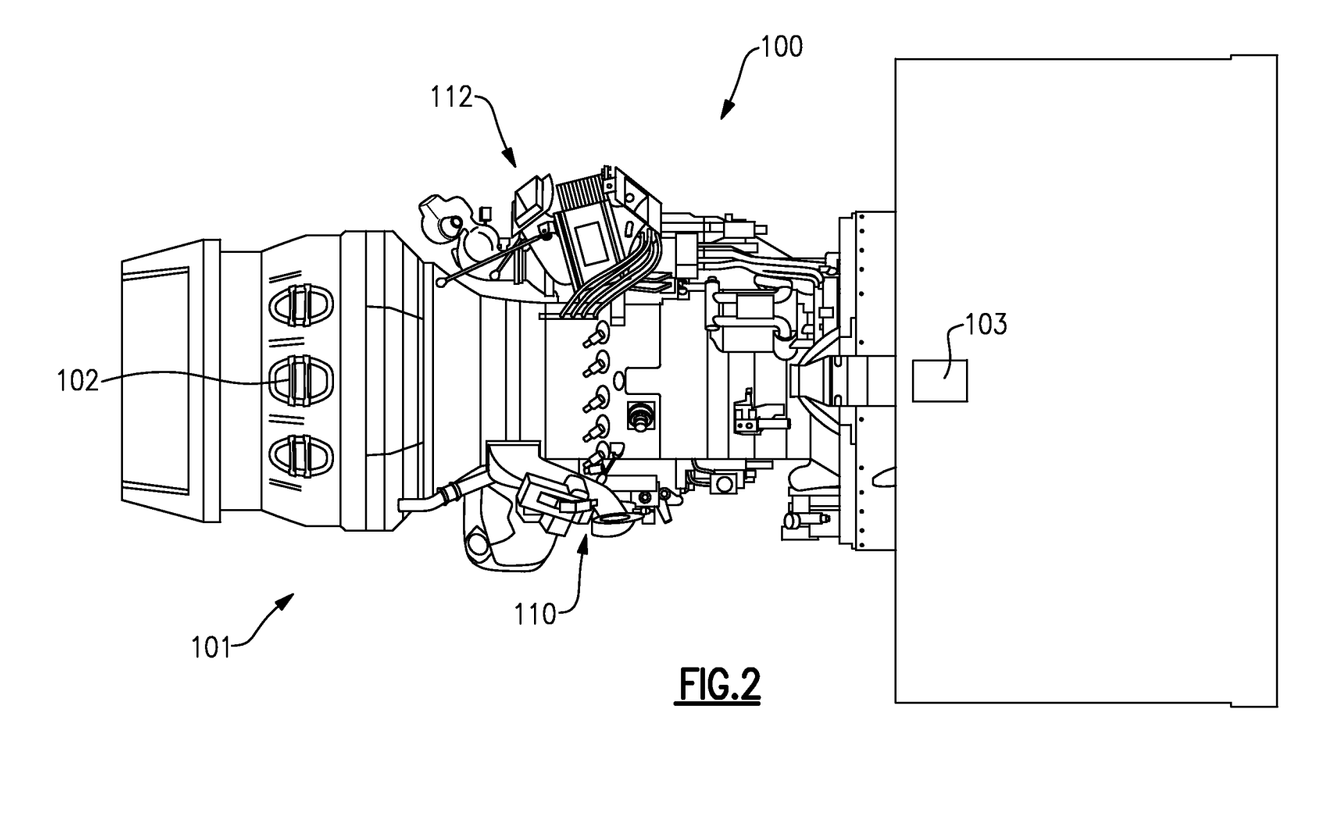
FIG. 2 is a top view of a gas turbine engine with its outer housing removed.

FIG. 2 shows a gas turbine engine 100 and a top side 101. There is a mount clevis 103, which is generally at a top dead center location on the engine 100, and will provide a mount location when the engine is mounted on an aircraft. A rear clevis 102 also defines the top dead center location.

The engine 100 could be said to have a right hand side 110 and a left hand side 112.

Figure 3:
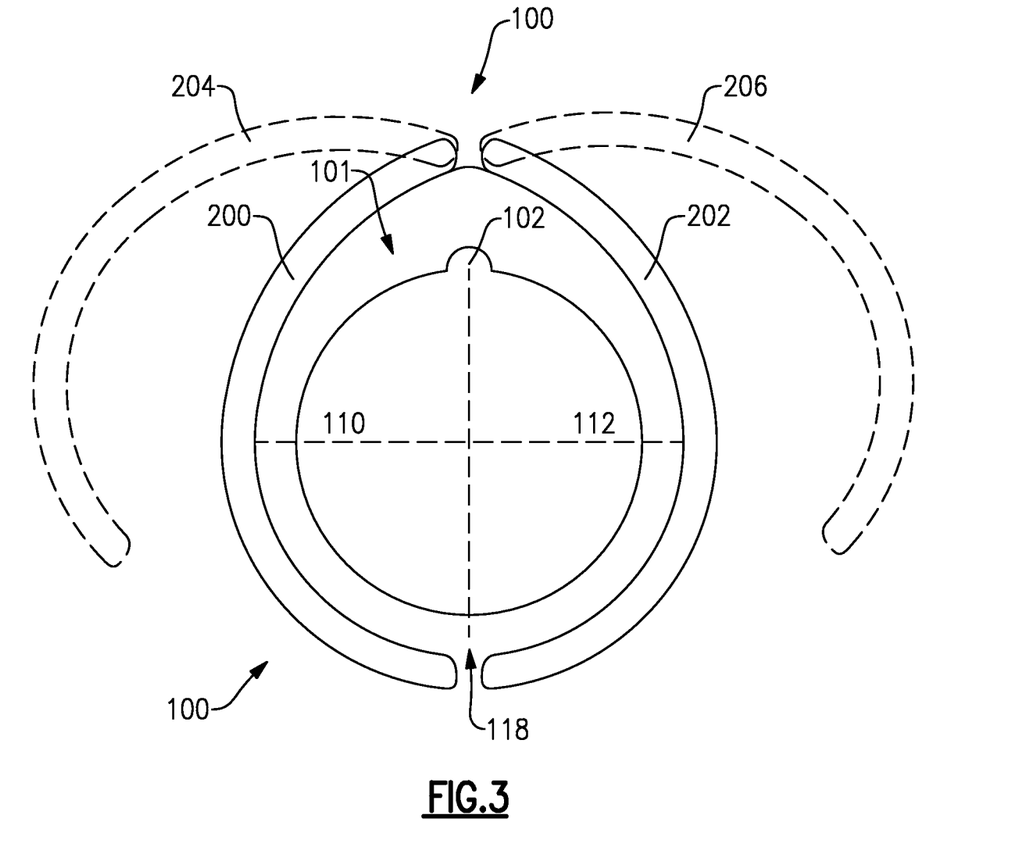
FIG. 3 schematically shows quadrants on the gas turbine engine.

FIG. 3 schematically shows the engine 100 and the location of the clevis 102. A first and a second semi-circle can be defined 180° away from the clevis 102 and would define the right and left hand sides 110 and 112. A bottom quadrant 118 extends to a location spaced 90° on each side of the clevis 102. The top quadrant, or side 101 is defined across the other 180°.

As shown schematically, pivoting doors 200 and 202 provide access for maintenance of many components within the gas turbine engine 100. The doors 200 and 202 are shown pivoted at 204 and 206 to an access position.

In the prior art, the arrangement of components is not well ordered, such that maintenance was not always easy.

Figure 4:
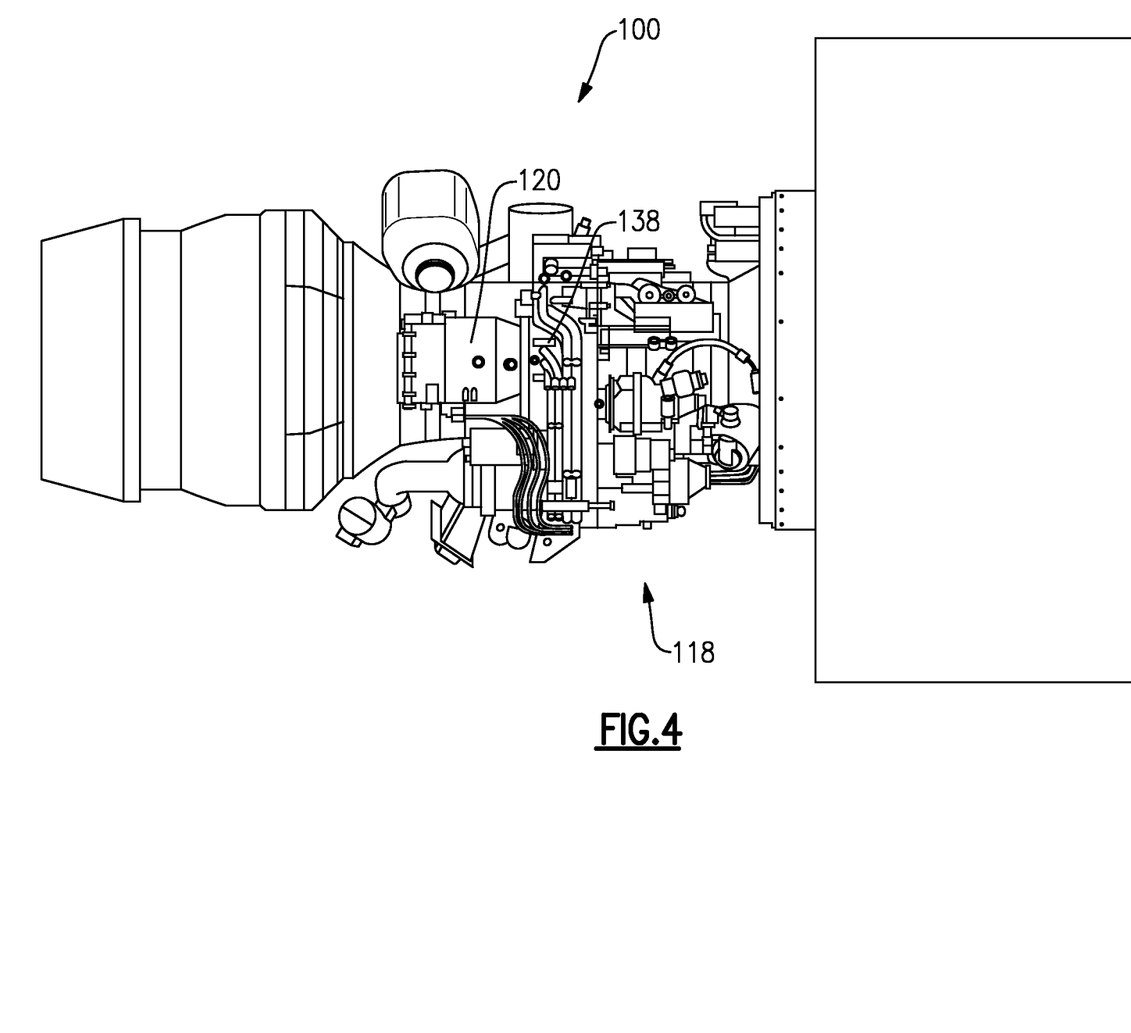
FIG. 4 is a bottom view.

FIG. 4 shows a view of bottom quadrant 118. An air frame generator 120 and a gearbox 138 are shown at the bottom. These are the heaviest components on the engine and are desirably placed near the bottom to facilitate installation or removal while minimizing potential for damage to other components.

Figure 5:
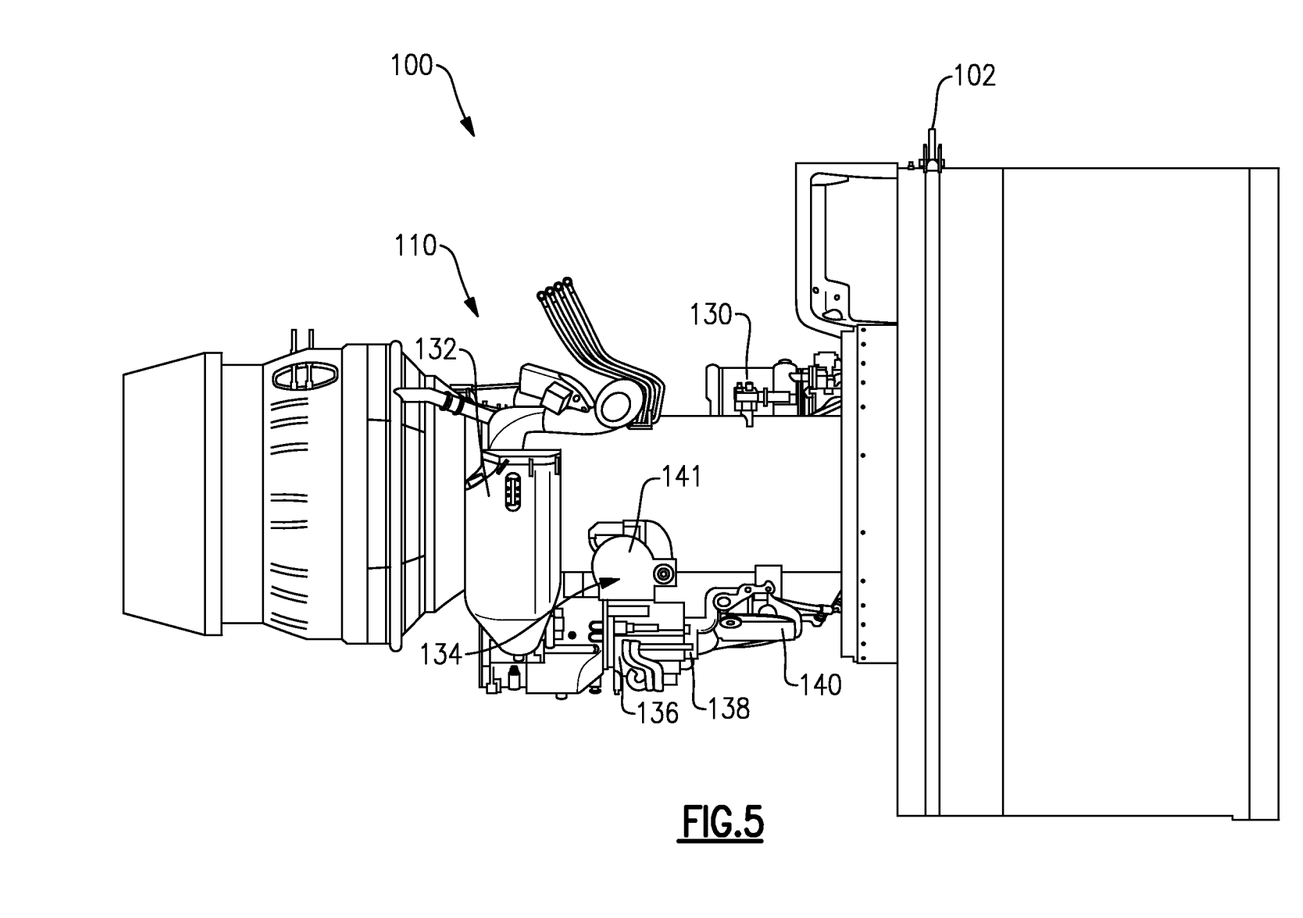
FIG. 5 shows one side.

FIG. 5 shows a right side view. The right side 110 may include the bulk of the oil system components. As an example, an oil tank 132, a fuel/oil cooler 130, an oil filter 134 and an oil pump 140 are shown. In addition, oil control module 136 is shown which may include valves, sensors and filters.

The heaviest component in the oil system, namely, the oil pump 140 is placed vertically below the lighter components such as the cooler 130 and the oil tank 132. A variable oil reduction valve 141 is also shown. Notably, placing the fuel/oil cooler 130 on top of the engine 100 also facilitates communication to the fuel system components, which are on the left hand side of the engine.

When a worker wants to perform maintenance, repair or simple inspection on the oil system, only door 200 need be opened. All of the components will be easily accessible and are within the one side semi-circle of the engine, defined relative to the vertical axis once the engine is mounted on an aircraft, but also defined relative to the clevis 102 as shown in FIG. 3.

Figure 6:
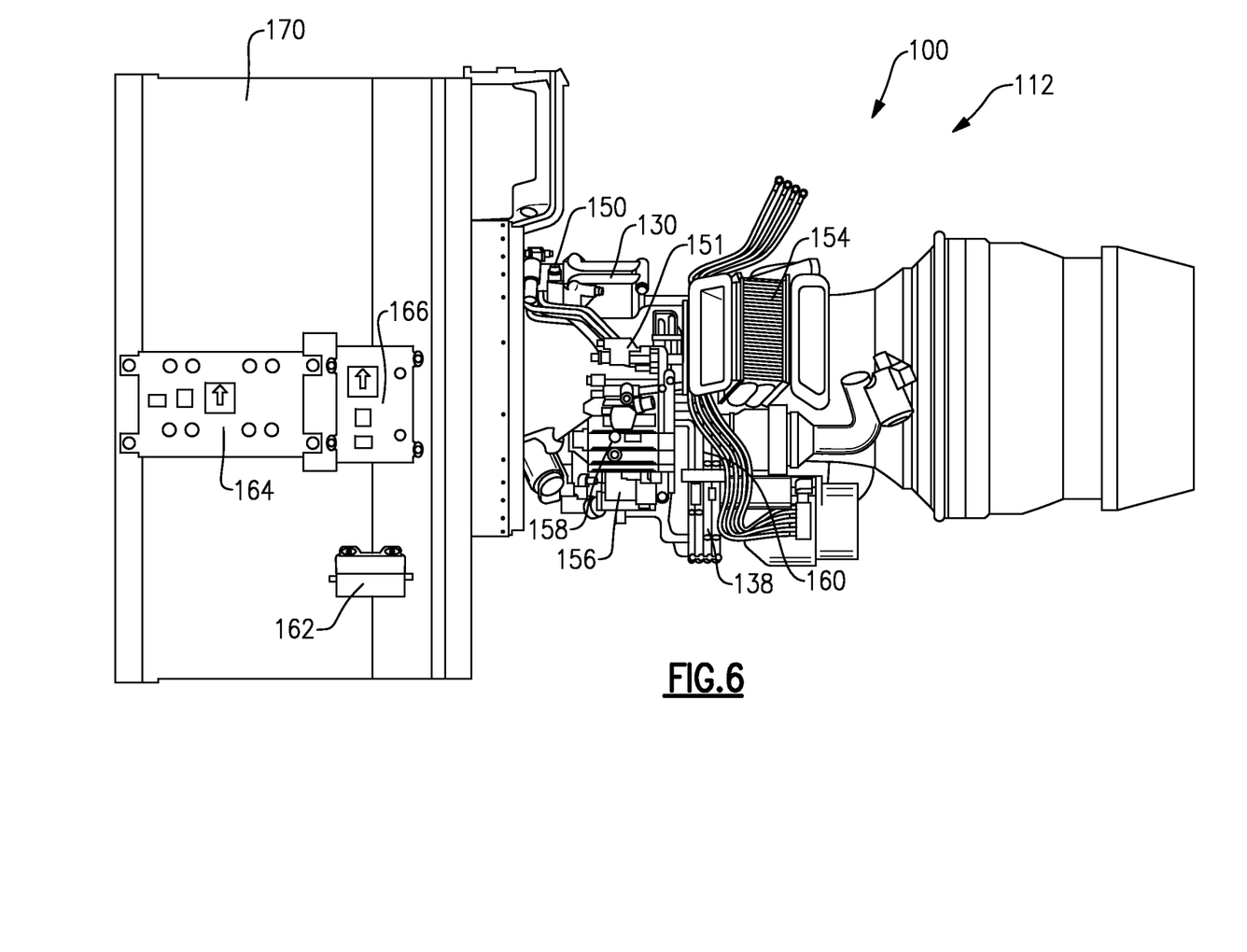
FIG. 6 shows an opposed side.

FIG. 6 shows the left hand side 112. The fuel system components include a fuel pump and control 158, a fuel filter 156, a fuel/oil manifold 160, a fuel flow meter 151, the fuel/oil cooler 130 and a fuel/oil cooler bypass valve 150. An air oil cooler 154 is also positioned adjacent the top of the engine.

In addition, the electronics are on the outer surface of the fan case 170. In particular, an electronic engine controller 164 is positioned adjacent to a prognostic health and monitoring unit 166. Further, an igniter box 162 is positioned adjacent to the components 164 and 166. Again, a worker working on the fuel components would now have access to all of the components in an easily accessible area and with only opening the door 202.

With the disclosed arrangement, the maintenance of the engine is facilitated. Moreover, by positioning the heavier components vertically below the lighter components, the likelihood of damage to components during repair is reduced.

By providing the fuel system components generally on one side of the engine, not only is maintenance facilitated, but also trouble-shooting is made easier. The arrangement also reduces tube routing lengths and complexity. All of this enhances packaging, aesthetics, maintenance, cost and weight.

Similarly, locating the oil system component on the opposite side of the engine facilitates both trouble-shooting and maintenance. Again, the arrangement reduces tube routing lengths and complexity which will enhance packaging, aesthetics, maintenance, cost and weight.

Locating the shared components (such as the fuel-oil cooler) near the top center of the engine minimizes tube routing lengths and complexity between the two systems. Again, this enhances packaging, aesthetics, maintenance, cost and weight.

Similarly, locating the electric components on the fan case reduces wire harness routing lengths and complexity. This enhances packaging, aesthetics, maintenance, cost and weight also.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
   a compressor, a combustor and a turbine;
   a housing for said gas turbine engine, with said housing including a mount member to define a vertically upper location, and sides of the engine being defined on opposed sides of the mount, with a fuel filter, a fuel pump and a fuel flow meter being positioned on a first side and an oil pump, an oil filter and an oil tank positioned on a second of said sides; and
   wherein pivoting doors are associated with each of the said first and second sides to provide access to components.
2. The gas turbine engine as set forth in claim 1, wherein an electronic engine control, a prognostic health and monitoring unit and an igniter box are all positioned on one of said first and second sides.
3. The gas turbine engine as set forth in claim 2, wherein a fuel/oil cooler is positioned at a vertically upper location.
4. The gas turbine engine as set forth in claim 2, wherein said fuel pump is positioned vertically below the fuel flow meter.
5. The gas turbine engine as set forth in claim 4, wherein said oil pump is positioned vertically below said oil tank.
6. The gas turbine engine as set forth in claim 5, wherein a main gearbox is positioned in a vertically lower location.
7. The gas turbine engine as set forth in claim 6, wherein a generator is also positioned in said vertically lower location.
8. The gas turbine engine as set forth in claim 1, wherein a fuel/oil cooler is positioned at a vertically upper location.
9. The gas turbine engine as set forth in claim 1, wherein said fuel pump is positioned vertically below the fuel flow meter.
10. The gas turbine engine as set forth in claim 1, wherein said oil pump is positioned vertically below said oil tank.
11. The gas turbine engine as set forth in claim 9, wherein a main gearbox is positioned in a vertically lower location.
12. The gas turbine engine as set forth in claim 11, wherein a generator is also positioned in said vertically lower location.
13. The gas turbine engine as set forth in claim 1, wherein a generator is positioned at a vertically lower location.

* * * * *